US012649320B2

(12) United States Patent
Hirano

(10) Patent No.: US 12,649,320 B2
(45) Date of Patent: Jun. 9, 2026

(54) WHITE INK PRINTING METHOD AND PRINTED MATTER

(71) Applicant: Masanori Hirano, Kanagawa (JP)

(72) Inventor: Masanori Hirano, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 269 days.

(21) Appl. No.: 18/533,790

(22) Filed: Dec. 8, 2023

(65) Prior Publication Data

US 2024/0227412 A1 Jul. 11, 2024

(30) Foreign Application Priority Data

Jan. 6, 2023 (JP) ................................. 2023-001186
Apr. 21, 2023 (JP) ................................. 2023-069814

(51) Int. Cl.
*B41J 2/21* (2006.01)
*B41J 2/01* (2006.01)
(Continued)

(52) U.S. Cl.
CPC ............... *B41J 2/2117* (2013.01); *B41J 2/01* (2013.01); *B41J 2/211* (2013.01); *B41J 2/2114* (2013.01); *B41J 3/4078* (2013.01); *B41M 5/0047* (2013.01)

(58) Field of Classification Search
CPC ... B41J 2/01; B41J 2/211; B41J 2/1433; B41J 2/17; B41J 2/17593; B41J 2/2107; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 11/002; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164; B41J 2/162; B41J 2/161; B41J 2/19; B41J 15/04; B41J 25/001; B41J 25/34; B41J 25/003; B41J 2/18; B41J 25/312; B41J 2025/008; B41J 2202/21;
(Continued)

(56) References Cited

U.S. PATENT DOCUMENTS

2004/0183842 A1 9/2004 Kobayashi et al.
2009/0081423 A1 * 3/2009 Sano .......................... B41J 2/07
427/210
(Continued)

FOREIGN PATENT DOCUMENTS

JP 2004-230379 A 8/2004
JP 2018-192405 A 12/2018
(Continued)

*Primary Examiner* — Manish S Shah
(74) *Attorney, Agent, or Firm* — IPUSA, PLLC

(57) ABSTRACT

A white ink printing method is provided that includes forming a white ink layer by applying a white ink to a predetermined region of a recording medium having a plurality of fabric grains. The forming the white ink layer includes forming a localized thick coating portion of the white ink layer. The localized thick coating portion is spanning a plurality of the fabric grains and not along a fabric grain direction.

8 Claims, 10 Drawing Sheets

(51) Int. Cl.
*B41J 3/407* (2006.01)
*B41M 5/00* (2006.01)

(58) Field of Classification Search
CPC .. B41J 2/17596; B41J 2/16508; B41J 2/1652; B41J 2/175; B41J 2/17563; C09D 11/36; C09D 11/40; C09D 11/30; C09D 11/38; C09D 11/32; C09D 11/322; C09D 11/324; C09D 11/328; C09D 11/101; C09D 11/102; C09D 11/005; C09D 11/54; C09D 11/52; C09D 11/106; C09D 11/326; C09D 11/107; C09D 11/03; C09D 11/037; C09D 11/033; C09D 11/108; B41M 5/0011; B41M 5/0017; B41M 5/0023; B41M 5/0047; B41M 7/00; B41M 7/0072; B41M 5/52; B41M 5/5218; B41M 5/5227
See application file for complete search history.

(56) References Cited

U.S. PATENT DOCUMENTS

| | | | | |
|---|---|---|---|---|
| 2012/0002225 | A1 | 1/2012 | Murai et al. | |
| 2012/0069359 | A1 | 3/2012 | Hirano | |
| 2012/0133992 | A1 | 5/2012 | Hirano | |
| 2012/0287211 | A1* | 11/2012 | Sano | B41J 2/07 347/100 |
| 2013/0057879 | A1 | 3/2013 | Takagi et al. | |
| 2013/0057923 | A1 | 3/2013 | Hirano | |
| 2015/0254505 | A1 | 9/2015 | Sohgawa et al. | |
| 2015/0306891 | A1 | 10/2015 | Sohgawa et al. | |
| 2018/0144218 | A1 | 5/2018 | Hirano et al. | |
| 2018/0336443 | A1 | 11/2018 | Kaiba et al. | |
| 2019/0283412 | A1 | 9/2019 | Nonoyama et al. | |
| 2020/0269598 | A1 | 8/2020 | Hirano | |
| 2021/0017414 | A1* | 1/2021 | Asakawa | B41J 2/2117 |
| 2021/0114381 | A1* | 4/2021 | Efendi | B41J 2/2117 |
| 2021/0129568 | A1* | 5/2021 | Miyasa | B41J 2/2114 |
| 2022/0111659 | A1 | 4/2022 | Abe et al. | |

FOREIGN PATENT DOCUMENTS

| | | | |
|---|---|---|---|
| JP | 2019-042982 | A | 3/2019 |
| JP | 2021-066788 | A | 4/2021 |
| WO | 2018/012229 | A1 | 1/2018 |
| WO | 2018/012230 | A1 | 1/2018 |

* cited by examiner

WHITE INK PRINTING METHOD AND PRINTED MATTER

CROSS-REFERENCE TO RELATED APPLICATIONS

This patent application is based on and claims priority pursuant to 35 U.S.C. § 119(a) to Japanese Patent Application Nos. 2023-001186 and 2023-069814, filed on Jan. 6, 2023 and Apr. 21, 2023, respectively, in the Japan Patent Office, the entire disclosure of each of which is hereby incorporated by reference herein.

BACKGROUND

Technical Field

The present disclosure relates to a white ink printing method and a printed matter.

Related Art

When conventional direct-to-garment (DTG) printers print on a recording medium, such as a black fabric or a dark-colored fabric other than white, a base is printed using white ink before printing with colored ink so that the colored ink used to form an image is not affected by the color of the fabric. Because the white ink has inferior fixability to the fibers of a fabric compared to colored ink, a pretreatment solution is further applied to the fabric before printing the white ink.

Conventionally, the process of applying the pretreatment solution is an offline operation that is performed separately from the printer. After applying the pretreatment solution, and carrying out heat and pressure treatment, printing is performed by setting the recording medium inside the DTG printer.

Here, in wet-on-wet printing, where white ink is printed in a state where the applied pretreatment solution is not dried, it is preferable that the white ink rapidly aggregates in the pretreatment solution to form a white ink layer. However, compared to a case where the pretreatment solution is applied offline, the fixability and robustness of the white ink layer is low, and cracking and peeling of the printed surface are more likely to occur.

SUMMARY

A white ink printing method according to embodiments of the present invention includes forming a white ink layer by applying a white ink to a predetermined region of a recording medium having a plurality of fabric grains. The forming the white ink layer includes forming a localized thick coating portion of the white ink layer. The localized thick coating portion is spanning a plurality of the fabric grains and not along a fabric grain direction.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1A:
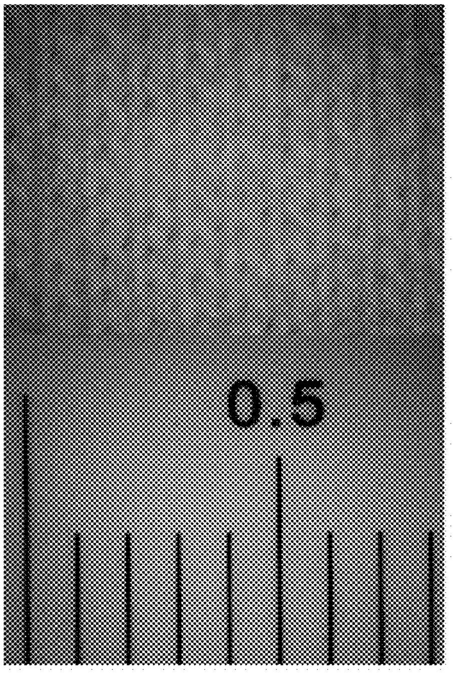
FIG. 1A is an enlarged photograph of a silk fabric, which is a representative medium that is conventionally used in direct-to-garment (DTG) printing.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity.

However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a", "an", and "the" are intended to include the plural forms as well, unless the context clearly indicates otherwise.

In the drawings of the present disclosure, reference numerals 10, 20, and 30 respectively represent a fabric grain, a thick coating portion, and a white ink layer (or base layer).

According to embodiments of the present invention, a white ink printing method is provided that produces a printed matter having high image robustness and excellent wearing comfort.

(White Ink Printing Method)

The white ink printing method includes a white ink layer forming process, and can include other processes if preferred.

Figure 1B:
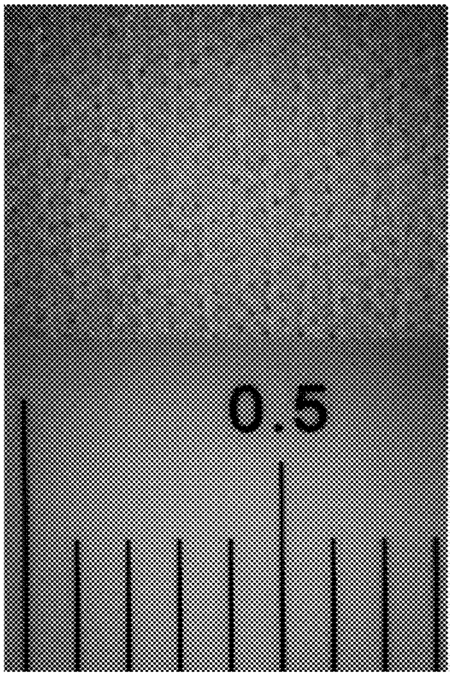
FIG. 1B is an enlarged photograph of a polyester fabric, which is a representative medium that is conventionally used in direct-to-garment (DTG) printing.

FIGS. 1A and 1B are enlarged photographs of a silk fabric (FIG. 1A) and a polyester fabric (FIG. 1B), which are representative media that are conventionally used in direct-to-garment (DTG) printing.

As illustrated in FIGS. 1A and 1B, the fabrics used in DTG printing have fabric grains corresponding to the warp and weft threads that serve as a reference when weaving a fabric. While based on similar fibers, the weaving is much coarser than that of paper, and the weaving is configured by a pitch of approximately several hundred μm to 1 mm.

In a conventional technology that relates to such fabric grains, a method including detecting a fabric grain of a fabric to be printed, determining the direction an ink easily bleeds/does not easily bleed, and determining a print image pattern has been proposed.

Figure 2:
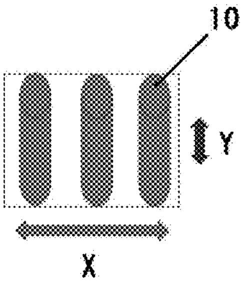
FIG. 2 is a schematic diagram describing the elasticity of a fabric with respect to the fabric grains (vertical grains)

FIG. 2 is a schematic diagram describing the elasticity of a fabric with respect to the fabric grains (vertical grains). As illustrated in FIG. 2, the fabric does not easily stretch in the direction of the fabric grains (Y), and easily stretches in a direction orthogonal to the fabric grains (X). In T-shirts and the like, because the direction of stretching affects the ease and comfort of wearing, a "vertical grain" fabric is generally used.

Figure 3A:
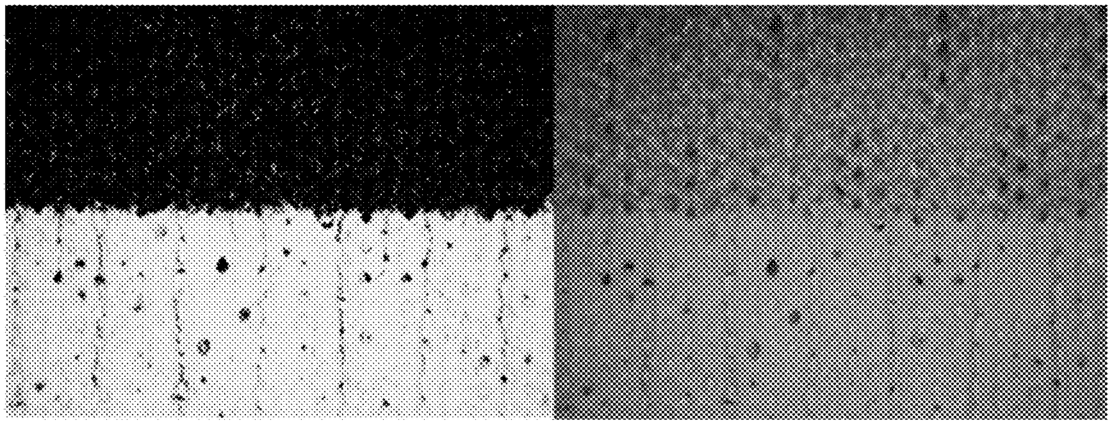
FIG. 3A is an enlarged photograph of a black cotton fabric, which is a representative medium that is conventionally used in direct-to-garment (DTG) printing.
Figure 3B:
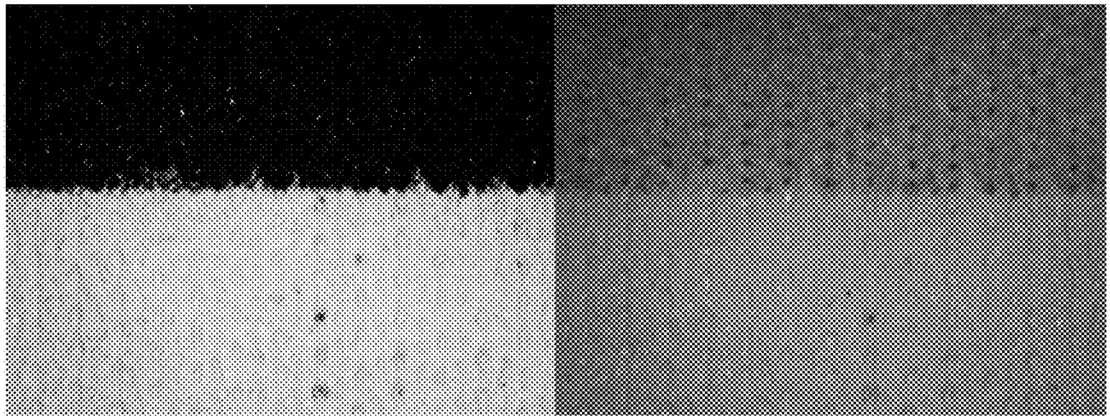
FIG. 3B is an enlarged photograph of a black polyester fabric, which is a representative medium that is conventionally used in direct-to-garment (DTG) printing.

FIGS. 3A and 3B are photographs of a black cotton fabric (FIG. 3A) and a black polyester fabric (FIG. 3B). In each of FIGS. 3A and 3B, the left part is an actual photograph and the right part is a monochrome photograph taken with an infrared LED light source, and the lower part is a part that has been printed with white ink using a conventional method and the upper part is a part in which the fabric is exposed. Like the white fabrics illustrated in FIGS. 1A and 1B, the black cotton fabric is coarser than the black polyester fabric, which leads to a difference in the finish of the surface printed with white ink.

Figure 4:
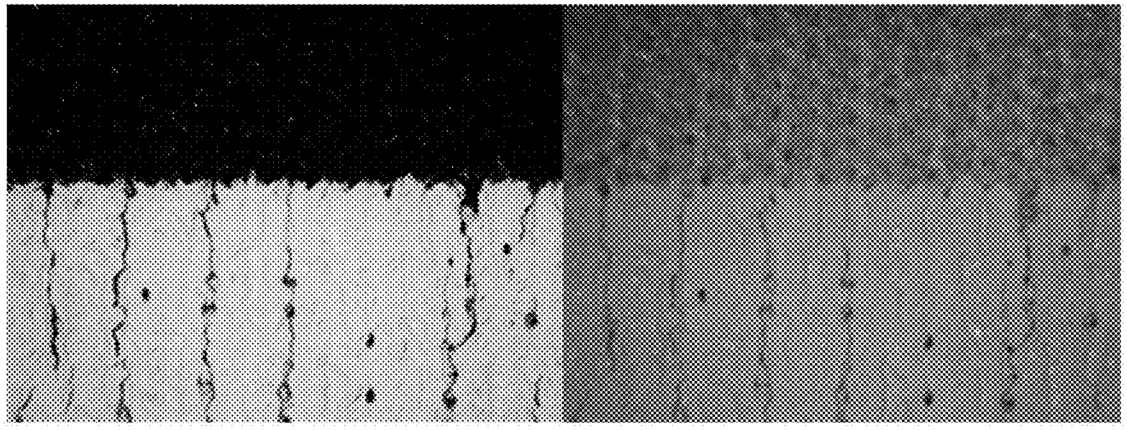
FIG. 4 is an actual photograph of a black polyester fabric after washing in a washing machine and air drying (left), and a monochrome photograph taken with an infrared LED light source (right)

FIG. 4 is photographs of a black polyester fabric after washing in a washing machine and air drying, where the left part is an actual photograph and the right part is a monochrome photograph taken with an infrared LED light source. It can be seen that cracks have formed on the surface printed with white ink along the fabric grains. The cracks increase as the T-shirt is repeatedly used (worn), washed, and dried. Further, peeling and detachment of the white ink layer occurs from the parts where the cracks connect to each other.

Figure 5:
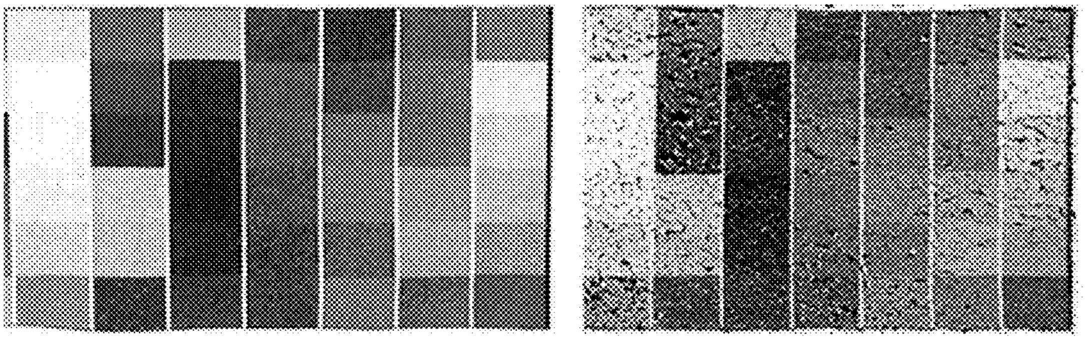
FIG. 5 is an actual image of a fabric taken immediately after printing using a colored ink after printing with white ink using a conventional method (left), and an actual image after repeating washing and drying of the fabric ten times (right)

FIG. 5 includes an actual image of a fabric taken immediately after printing using a colored ink after printing with white ink using a conventional method (left), and an actual image after repeating washing and drying of the fabric ten times (right).

As a result of intensive study, the inventors have found that by applying a white ink and forming a white ink layer on a predetermined region of a recording medium having a plurality of fabric grains, and locally forming thick coating portions of the white ink layer spanning a plurality of the fabric grains, it is possible to obtain a printed matter with high image robustness and excellent wearing comfort.

The white ink printing method according to embodiments of the present invention includes a white ink layer forming process, and can include other processes if preferred.

Hereinafter, examples of the white ink printing method according to embodiments of the present invention will be described with reference to the drawings. However, the present invention is in no way limited to these examples.

<White Ink Layer Forming Process>

The white ink layer forming process is a process of forming a white ink layer by applying a white ink to a predetermined region of a recording medium having a plurality of fabric grains, and locally forming thick coating portions of the white ink layer spanning a plurality of the fabric grains and not along a fabric grain direction.

As a result of applying a thick coat of white ink spanning the fabric grains, which are the starting points of cracks in the white ink layer, it is possible to reduce cracking and peeling of the white ink layer, and the strength of the white ink layer can be improved. Furthermore, because the thick coating portions of the white ink layer are locally formed, it is possible to reduce the feeling of foreign matter caused by applying a thick coat of white ink. Moreover, because the amount of white ink that is discharged can be reduced, costs can be reduced.

The method of applying the white ink is not particularly limited, and can be appropriately selected depending on the purpose. Examples thereof include, but are not limited to, an inkjet method, a blade coating method, a gravure coating method, a gravure offset coating method, a bar coating method, a roll coating method, a spray coating method, a knife coating method, an air knife coating method, a comma coating method, a U comma coating method, an AKKU coating method, a smoothing coating method, a microgravure coating method, a reverse roll coating method, a four-roll coating method, a five-roll coating method, a dip coating method, a curtain coating method, a slide coating method, and a die coating method. Among these methods, an inkjet method is preferable.

The predetermined region is a region in which white ink is applied to form a white ink layer that serves as a base of the colored ink used to form an image, and includes a non-thick coating portion of white ink, and thick coating portions in which the adhesion amount of white ink is 2 times or more and 8 times or less that of the non-thick coating portion.

The thick coating portions are regions in which, after forming the white ink layer (hereinafter sometimes referred to as "base layer") in the entire predetermined region, white ink is additionally applied to the base layer.

The thick coating portion is locally formed spanning a plurality of the fabric grains on the recording medium.

Figure 6A:
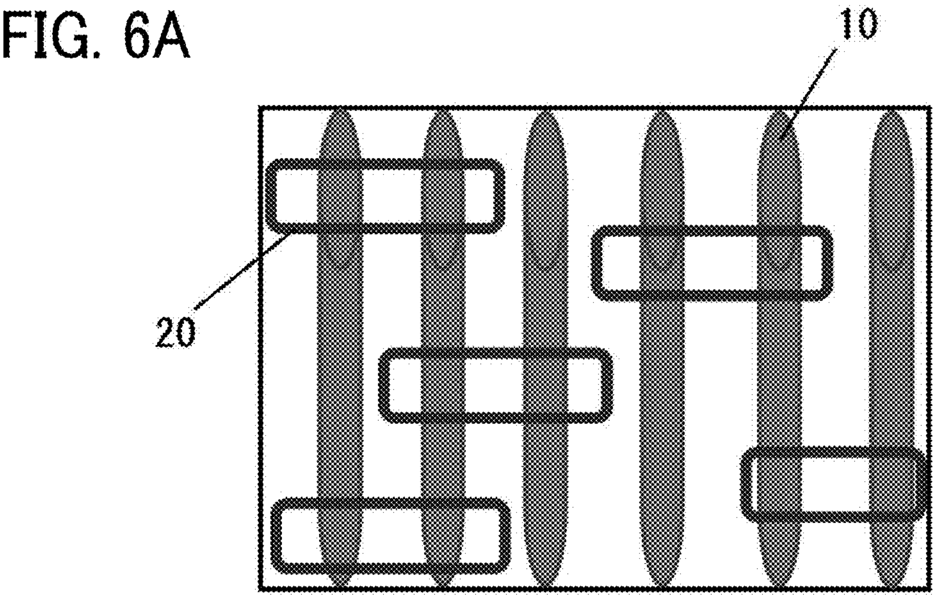
FIG. 6A is a schematic diagram illustrating thick coating portions that are locally formed spanning a plurality fabric grains on a recording medium.
Figure 6B:
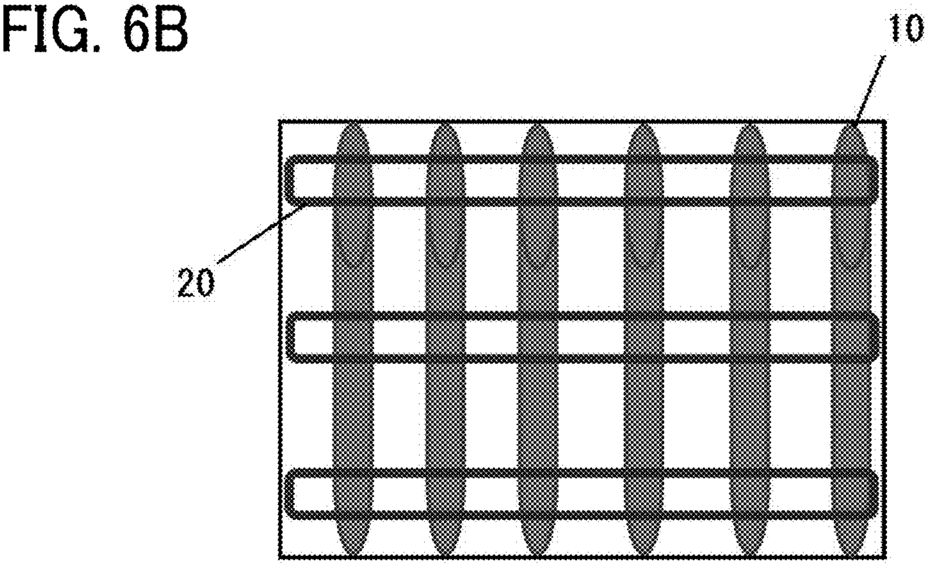
FIG. 6B is a schematic diagram illustrating thick coating portions that are locally formed spanning a plurality fabric grains on a recording medium.
Figure 6C:
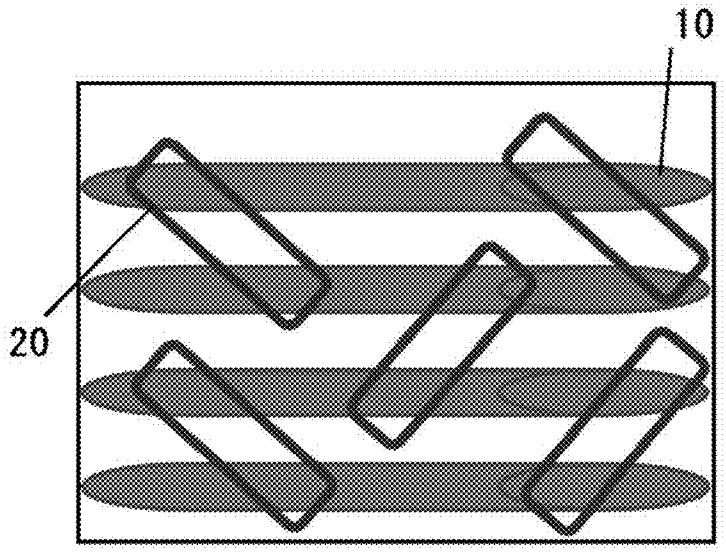
FIG. 6C is a schematic diagram illustrating thick coating portions that are locally formed spanning a plurality fabric grains on a recording medium.

Note that, "spanning a plurality of the fabric grains" refers to a thick coating portion being formed of a single, continuous region that is formed on two or more fabric grains, and examples include, but are not limited to, the patterns illustrated in FIGS. 6A to 6C.

The area (coverage ratio) of the thick coating portions is not particularly limited, and can be appropriately selected depending on the purpose. However, the area (coverage ratio) is preferably 50% or less with respect to the predetermined region, and more preferably 10% or more and 33% or less. When the area (coverage ratio) is 50% or less, the adhesion amount of white ink per unit area can be reduced. Therefore, the flexibility of a recording medium such as a fabric can be prevented from being lost, and the feeling of foreign matter, such as of a rubber coating film, can also be reduced. As a result of reducing the adhesion amount of white ink, the rigidity of the white ink layer can be appropriately reduced. Therefore, a printed matter having excellent wearing comfort can be obtained.

The average thickness of the thick coating portions is not particularly limited, and can be appropriately selected according to the purpose. However, the average thickness is preferably 100 μm or more. When the average thickness is 100 μm or more, an improvement in the strength of the white ink layer can be achieved. Therefore, cracking and peeling of the white ink layer can be reduced.

The measurement method of the average thickness of the thick coating portion is not particularly limited, and can be appropriately selected according to the purpose. For example, the measurement can be performed using a digital microscope VHX series (manufactured by Keyence Corporation). As a specific measurement method, the printed portion on a recording medium (such a T-shirt) is cut into a size that can be placed on the stage of a digital microscope VHX series (manufactured by Keyence Corporation). Then, the average thickness of the thick coating portions is calculated by measuring the average value of a total of five locations in the predetermined region.

The localized thick coating portions of the white ink layer are not particularly limited, and can be appropriately selected according to the intended purpose. However, the thick coating portions are preferably formed based on a two-dimensional pattern having a distribution that is difficult to be visually recognized.

Figure 10A:
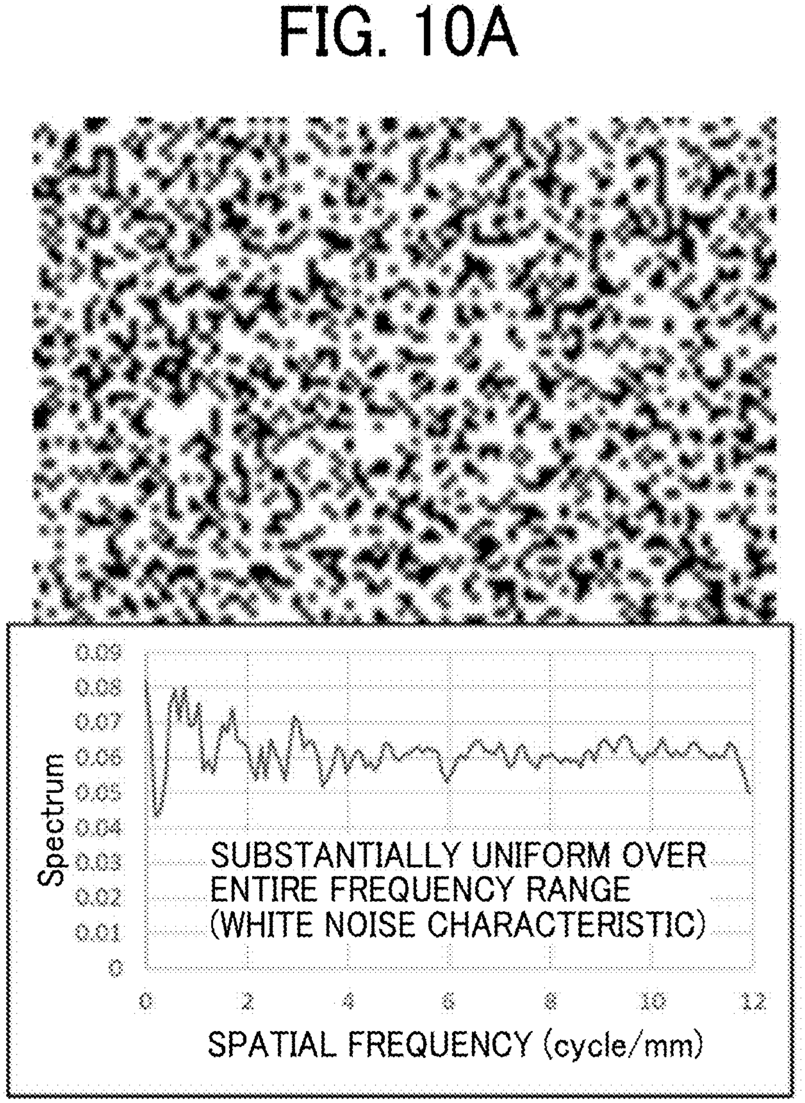
FIG. 10A is a schematic diagram illustrating a two-dimensional pattern of thick coating portions.
Figure 10B:
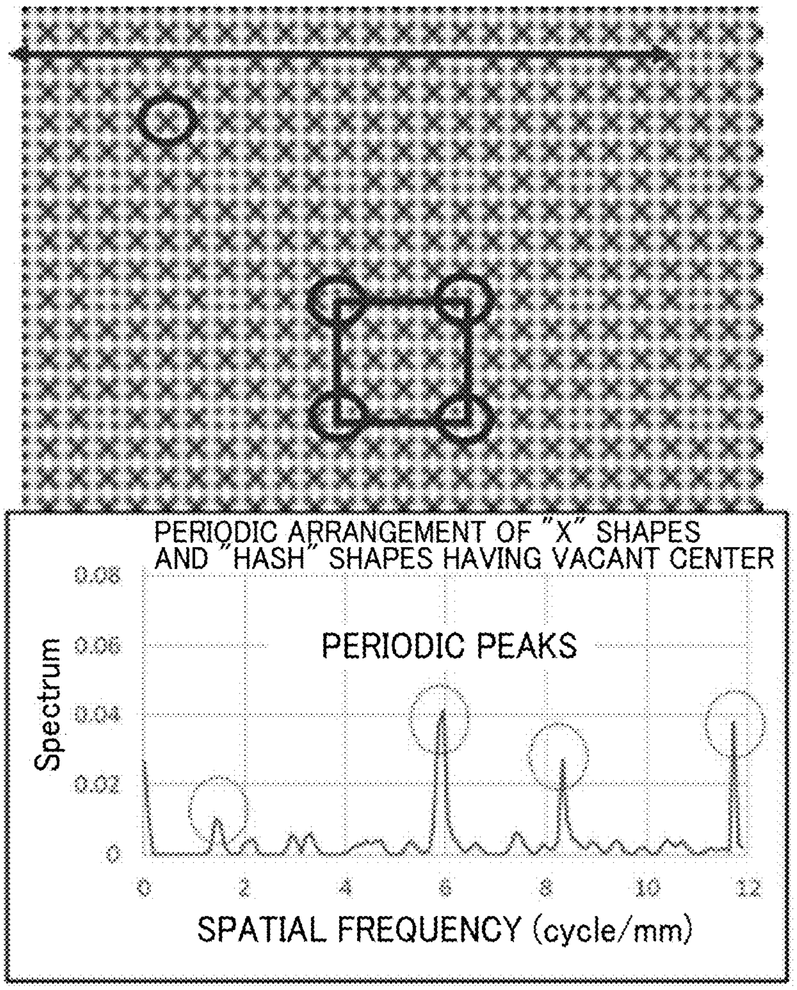
FIG. 10B is a schematic diagram illustrating a two-dimensional pattern of thick coating portions.
Figure 10C:
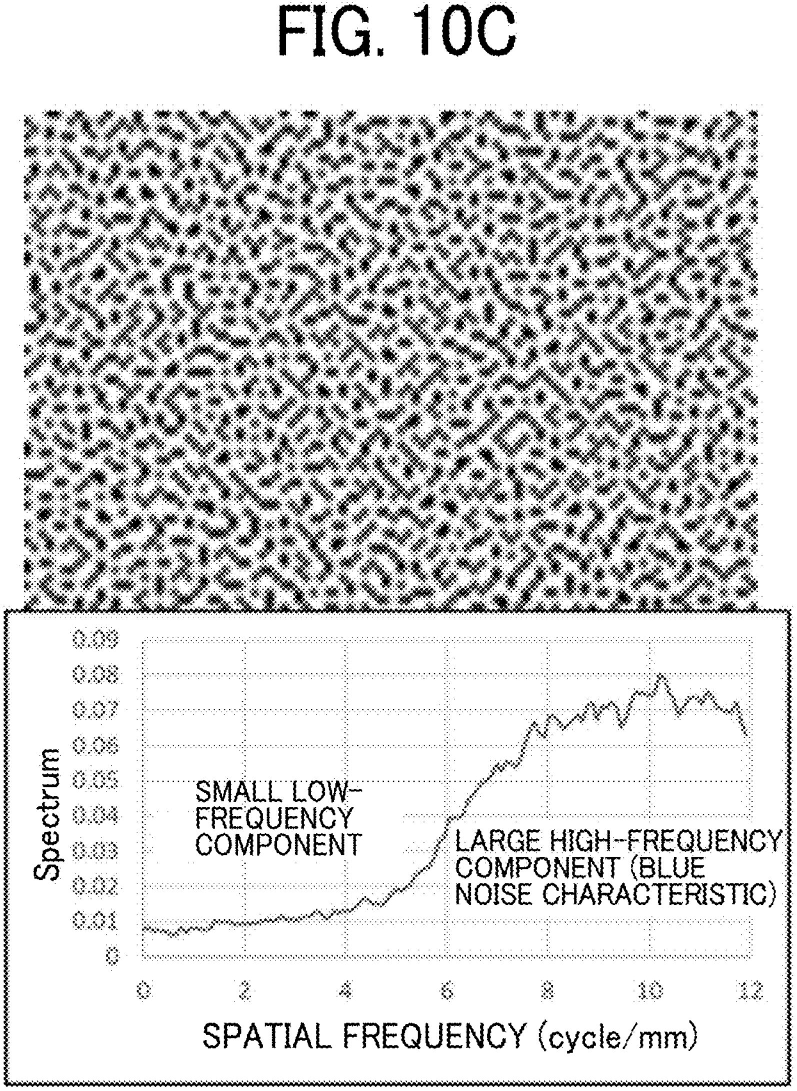
FIG. 10C is a schematic diagram illustrating a two-dimensional pattern of thick coating portions.

The two-dimensional distribution is not particularly limited, and can be appropriately selected according to the intended purpose. Examples thereof include, but are not limited to, a spatial frequency distribution-like pattern of a half-tone process (such as an FM mask). Specific examples thereof include the pattern illustrated in FIG. 10A, which does not have peaks but provides a rough feel, the pattern illustrated in FIG. 10B, which has unique prominent peaks (spatial frequency), and the pattern illustrated in FIG. 10C, which has a bias toward high-frequency components (that appears smooth).

The localized thick coating portions of the white ink layer are not particularly limited, and can be appropriately selected according to the intended purpose. However, the thick coating portions preferably include m types of thick coating portions (where m is an integer greater than or equal to 1) each having a connection length that is one or more times the fabric grain pitch. That is, the thick coating portions may be a combination of several types of thick coating portions spanning two, three or four rows.

The average thickness of the non-thick coating portion is not particularly limited, and can be appropriately selected according to the purpose. However, the average thickness is preferably 50 μm or less. When the average thickness is 50 μm or less, the white ink dries well after being applied. Furthermore, since the amount of white ink that is discharged can be reduced, the cost can be reduced. Moreover, the adhesion amount of white ink per unit area can be reduced. Therefore, the flexibility of a recording medium such as a fabric can be prevented from being lost, and the feeling of foreign matter, such as of a rubber coating film, can also be reduced.

Note that the average thickness of the non-thick coating portion is the average thickness of the portion of the predetermined region not including the thick coating portions.

The measurement method of the average thickness of the non-thick coating portion is not particularly limited, and can be appropriately selected according to the purpose. For example, the measurement can be performed using a digital microscope VHX series (manufactured by Keyence Corporation). As a specific measurement method, the printed portion on a recording medium (such a T-shirt) is cut into a size that can be placed on the stage of a digital microscope VHX series (manufactured by Keyence Corporation). Then, the average thickness of the non-thick coating portion is calculated by measuring the average value of a total of five locations in the predetermined region.

The ratio (A/B) of the average thickness (A) of the thick coating portions to the average thickness (B) of the non-thick coating portion is not particularly limited, and can be appropriately selected according to the purpose. However, the ratio (A/B) is preferably 2 to 4 from the perspective of obtaining superior robustness of the printed portion.

The angle of the direction of the thick coating portions with respect to the direction of the fabric grains is not particularly limited, and can be appropriately selected according to the purpose. However, the angle is preferably 45° or more and 135° or less, and is more preferably substantially orthogonal from the perspective of obtaining more superior image robustness.

Furthermore, when the angle is 45° or 135°, it is possible to obtain a printed matter having superior image robustness regardless of whether the fabric grains of the recording medium are vertical or horizontal grains.

The shape of the thick coating portions is not particularly limited, and can be appropriately selected according to the purpose. Examples thereof include, but are not limited to, a linear shape, a curved shape, a polygonal shape, a circular shape, and other complex shapes (hereinafter, sometimes referred to as a “design”).

Figure 7A:
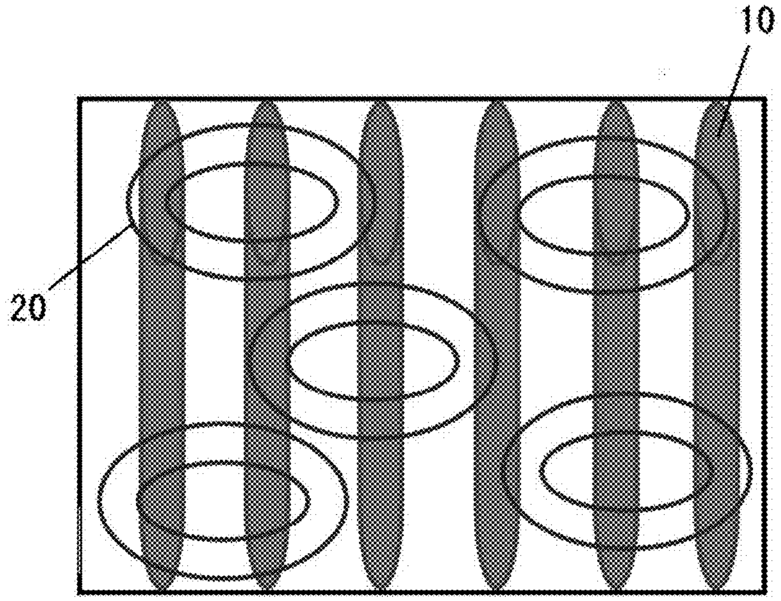
FIG. 7A is a schematic diagram illustrating a pattern of thick coating portions in which the thick coating portions have a "ring shape"
Figure 7B:
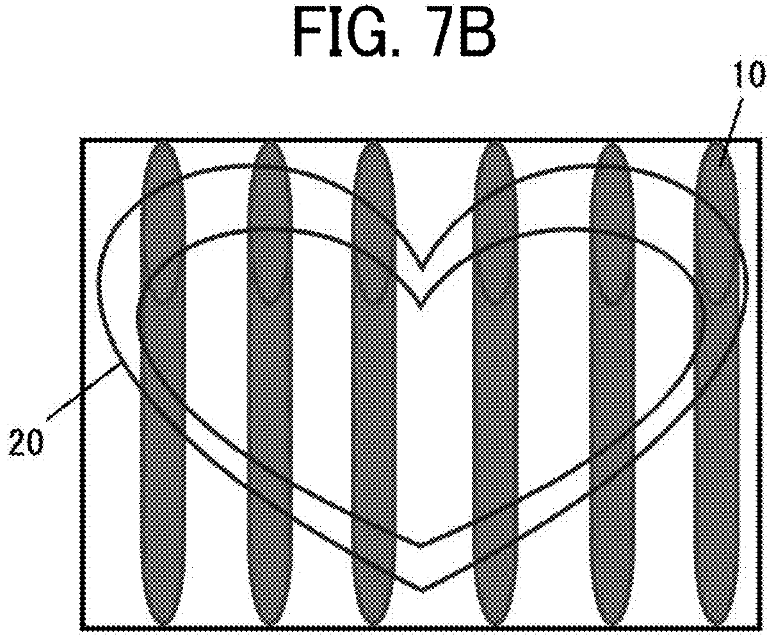
FIG. 7B is a schematic diagram illustrating a pattern of a thick coating portion in which the thick coating portion has a "heart-mark shape"

FIGS. 7A and 7B are schematic diagrams of cases where the shape of the thick coating portions are designs.

FIG. 7A is a pattern in which the thick coating portions have a “ring shape”. As long as the pattern is not a shape or distribution along the fabric grains, the pattern contributes to stress dispersion.

FIG. 7B is a pattern in which the thick coating portion has a “heart-mark shape”.

The method of forming the thick coating portions in the white ink layer forming process will be described with reference to FIGS. 8A to 8C.

Figure 8A:
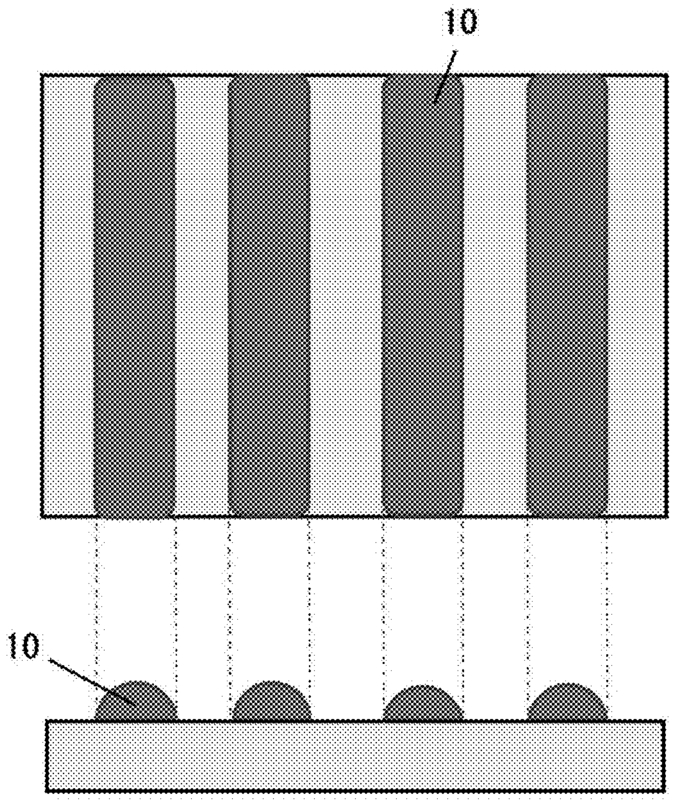
FIG. 8A is a schematic diagram illustrating a method of forming a thick coating portion in a white ink layer forming process.

As illustrated in FIG. 8A, the recording medium has a plurality of fabric grains. Note that, in FIG. 8A, the fabric grains are vertical grains.

Figure 8B:
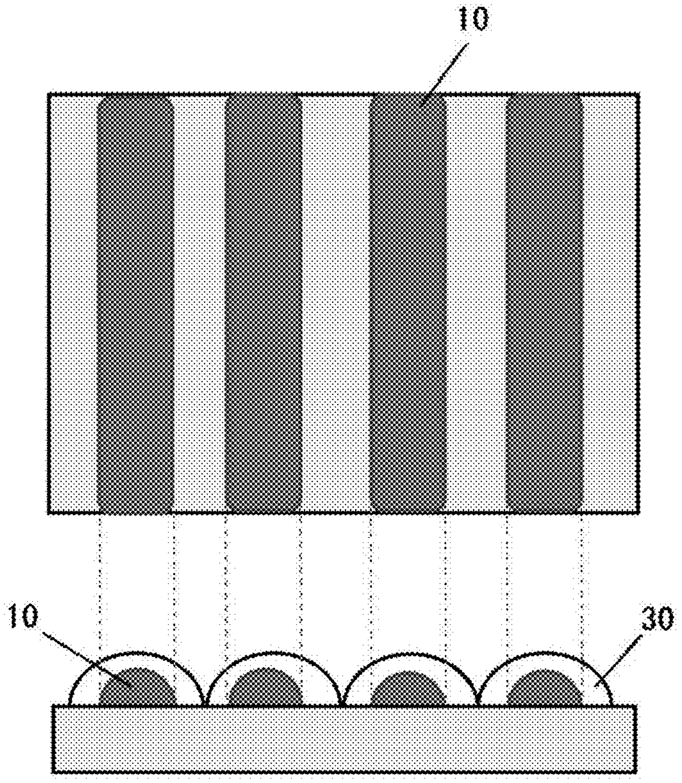
FIG. 8B is a schematic diagram illustrating a method of forming a thick coating portion in a white ink layer forming process.

As illustrated in FIG. 8B, a white ink layer (base layer) is formed by applying white ink to a predetermined region on the recording medium.

Figure 8C:
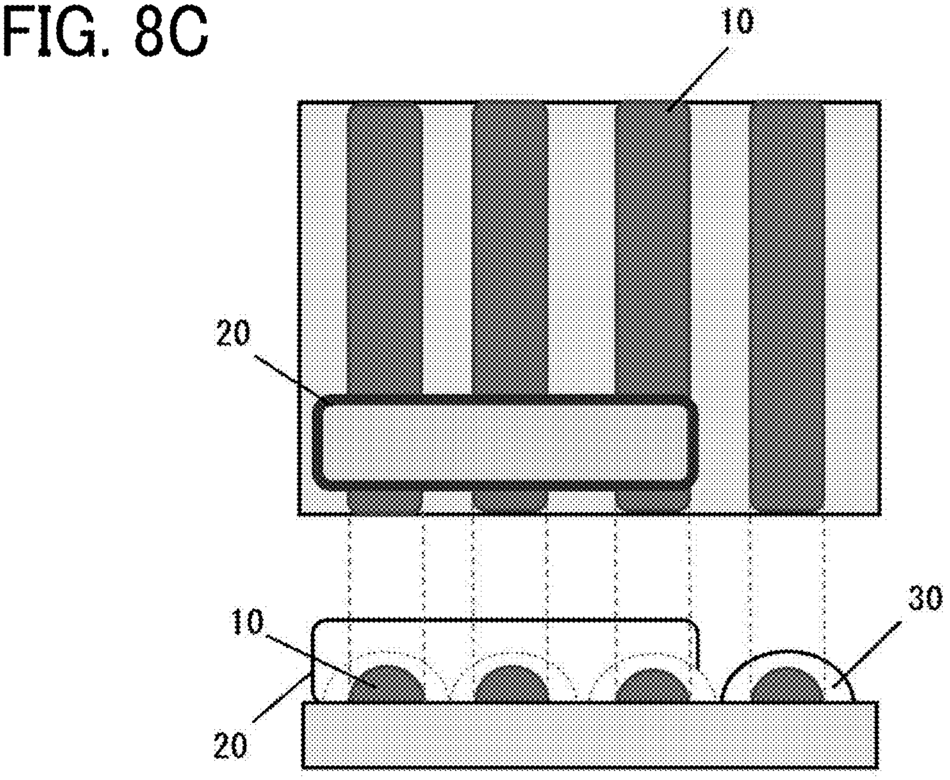
FIG. 8C is a schematic diagram illustrating a method of forming a thick coating portion in a white ink layer forming process.

Then, as illustrated in FIG. 8C, a thick coating portion is locally formed by further applying white ink on the white ink layer (base layer) that has been formed.

The formation pattern of the thick coating portions in the white ink layer forming process will be described with reference to FIGS. 9A and 9B.

The pattern of the thick coating portions is not particularly limited, and can be appropriately selected according to the purpose. The pattern is preferably dispersed and has no regularity so as to avoid new stress concentration in directions other than the direction of the fabric grains.

Examples of the method of generating a pattern that is dispersed and has no regularity include, but are not limited to, a method using an FM mask pattern having a blue noise characteristic. As a result of forming the thick coating portions with a pattern that is "dispersed and has no regularity", the thick coating portions can be prevented from visually standing out.

Figure 9A:
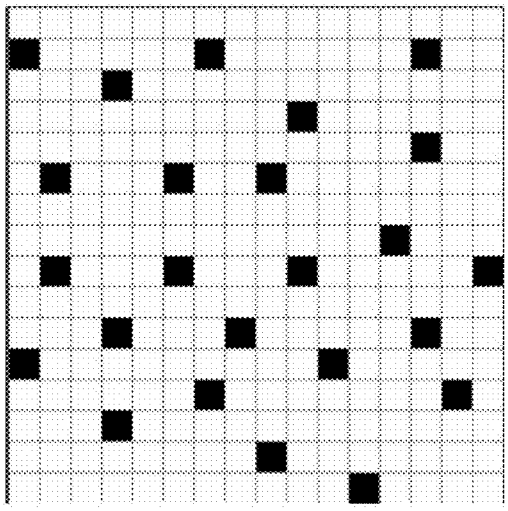
FIG. 9A is a schematic diagram illustrating an FM mask pattern used as a seed.

FIG. 9A is a schematic diagram illustrating an FM mask pattern used as a seed for forming thick coating portions to "a length spanning two or more (a plurality of) fabric grains", which is a preferable condition.

Figure 9B:
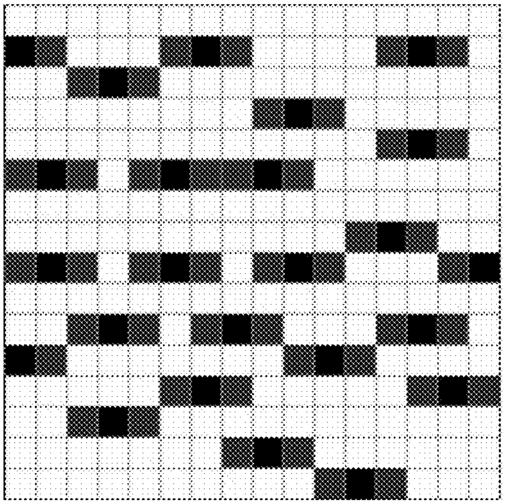
FIG. 9B is a schematic diagram illustrating a method of enlarging thick coating portions to "a length spanning two or more (a plurality of) fabric grains"

FIG. 9B a schematic diagram illustrating a method of enlarging the thick coating portions to "a length spanning two or more (a plurality of) fabric grains".

Note that the length of the thick coating portions is not particularly limited as long as the length is at least a length that satisfies the condition, and can be appropriately selected according to the purpose. Because the connecting portions of the thick coating portions become stiff, it is preferable from the viewpoint of flexibility that the length is not constant such that the stress dispersion is enhanced. From the viewpoint of the flexibility of the printed surface, it is not always preferable to connect/extend the thick coating portions. However, because the bulging (three-dimensional effect) and differences in gloss of the printed surface resulting from the thick coating can be an added value from the viewpoint providing a decorative effect to a garment, the method causes the thick coating portions to stand out.

-White Ink-

The white ink is not particularly limited, and can be appropriately selected according to the purpose. However, the white ink preferably contains a white pigment, a resin, an organic solvent, and a surfactant, and further contains other components if preferred.

The white ink is preferably a white ink for inkjet printing that can be discharged using an inkjet method.

The white pigment is not particularly limited, and can be appropriately selected according to the purpose. Examples include, but are not limited to, inorganic pigments such as titanium oxide, iron oxide, calcium carbonate, barium sulfate, and aluminum hydroxide.

The content of the white pigment is not particularly limited, and can be appropriately selected according to the purpose. However, the content is preferably 5% by mass or more and 30% by mass or less with respect to the white ink.

The resin is not particularly limited, and can be appropriately selected according to the purpose. Examples include, but are not limited to, polyester resins, urethane resins, and acrylic resins. Among these, a polyester resin is preferable.

The organic solvent is not particularly limited, and can be appropriately selected according to the purpose. Examples include, but are not limited to, polyhydric alcohols, ethers such as polyhydric alcohol alkyl ethers and polyhydric alcohol aryl ethers, nitrogen-containing heterocyclic compounds, amides, amines, and sulfur-containing compounds.

The content of the organic solvent is not particularly limited, and can be appropriately selected according to the purpose. However, the content is preferably 40% by mass or more and 80% by mass or less with respect to the white ink.

The surfactant is not particularly limited, and can be appropriately selected according to the purpose. It is possible to use, for example, an anionic surfactant, a cationic surfactant, an amphoteric surfactant, and nonionic surfactant.

-Recording Medium-

The recording medium is not particularly limited, and can be appropriately selected according to the purpose. Examples include, but are not limited to, silk fabrics and polyester fabrics.

The color of the recording medium is not particularly limited, and can be appropriately selected according to the purpose. Examples include, but are not limited to, dark colors such as black, red, blue, and green.

(Printed Matter)

The printed matter of the present embodiment includes a recording medium having a plurality of fabric grains, a white ink layer formed on the recording medium, and a colored ink layer formed on the white ink layer.

The white ink layer includes a non-thick coating portion of white ink, and thick coating portions in which the adhesion amount of white ink is 2 times or more and 8 times or less that of the non-thick coating portion. The thick coating portions are formed spanning a plurality of the fabric grains of the recording medium.

The printed matter can be obtained through the production flow including the processes (1) to (11) below.

(1) Select a fabric as the recording medium. Because the pitch of the fabric grains varies depending on the type of fabric and product, the type of T-shirt fabric to be used is selected.

(2) Set the fabric grains of the selected fabric. The fabric of a T-shirt and the like generally has vertical grains.

(3) Calculate the fabric grain pitch. The calculation method is not particularly limited, and can be appropriately selected according to the purpose. Examples thereof include, but are not limited to, a method of performing the calculation by a visual measurement.

(4) Set a pattern to form the thick coating portions. A "random and dispersed" pattern based on an FM mask, or a connected pattern provided with some kind of "design" meaning is selected.

(5) Determine the connection length of the thick coating portions. The connection length of the thick coating portions is preferably a minimum length. The minimum length is preferably a length representing two times or more the fabric grain pitch calculated in (3) above.

(6) Create the print data based on (1) to (5) above using an application (such as RIP software and a printer driver). The print data assumes, for example, a DTG printer with a built-in inkjet head that allows coating of a pretreatment solution that assists fixing of the white ink or colored ink to the fabric, a white ink that serves as the base when printing on a black fabric or a dark fabric, and a colored ink for printing a picture or image pattern. The white ink printing method of the present embodiment is applicable even to printing systems in which the recording module of each ink is separated on a conveyor belt.

(7) Limit the print region of the thick coating portions of the white ink layer to the print region of the white ink. The printed parts having the thick coating patterns are determined by performing an AND operation with the "white ink print data". Even in the case of color reproduction assuming a fabric color such as a "black fabric use/dark fabric use" fabric, by performing an AND operation with the white ink data, it is possible to avoid application of an overly "thick coating" with respect to a color in which white is not used.

(8) Firstly, apply a pretreatment solution that assists in aggregation or fixing of the white ink to the fabric. In the case of a printer or printing machine that does not include a pretreatment solution coating mechanism, the pretreatment solution may be applied offline in advance.

(9) Form a white ink layer serving as a base for color printing using the white ink printing method of the present embodiment. First, the white ink layer is formed in a predetermined region of the fabric serving as the recording medium. Then, thick coating portions are locally formed in the predetermined region in which the white ink layer has been formed. The thick coating portions are formed spanning the fabric grains of the fabric. The thick coating portions may be formed a plurality of times.

(10) Print the image on the white ink layer using colored ink. The colored ink is not particularly limited, and can be appropriately selected according to the intended purpose. Known inks can be used.

(11) Perform heat treatment or pressure treatment in order to rapidly fix the printed image to the fabric.

Aspects of the present invention are as follows.

A first aspect is a white ink printing method comprising forming a white ink layer by applying a white ink to a predetermined region of a recording medium having a plurality of fabric grains. The forming the white ink layer includes forming a localized thick coating portion of the white ink layer. The localized thick coating portion is spanning a plurality of the fabric grains and not along a fabric grain direction.

A second aspect is the white ink printing method according to the first aspect, wherein the localized thick coating portion of the white ink layer is formed based on a two-dimensional pattern having a distribution which is difficult to be visually recognized.

A third aspect is the white ink printing method according to the first or second aspect, wherein the localized thick coating portion of the white ink layer includes m types of thick coating portions, where m is an integer greater than or equal to 1, each having a connection length that is one or more times a fabric grain pitch.

A fourth aspect is the white ink printing method according to any one of the first to third aspects, wherein the localized thick coating portion of the white ink layer is formed at an angle that is substantially orthogonal to the fabric grain direction.

A fifth aspect is the white ink printing method according to any one of the first to fourth aspects, wherein the localized thick coating portion of the white ink layer is formed at an angle that is 45° or more and 135° or less with respect to the fabric grain direction.

A sixth aspect is the white ink printing method according to any one of the first to fifth aspects, wherein an area of the localized thick coating portion of the white ink layer is 50% or less of an area of the predetermined region of the recording medium.

A seventh aspect is the white ink printing method according to any one of the first to sixth aspects, wherein the localized thick coating portion of the white ink layer forms a pattern based on a specific design having a connection length that is one or more times a fabric grain pitch.

An eighth aspect is a printed matter comprising: a recording medium having a plurality of fabric grains; a white ink layer on the recording medium; and a colored ink layer on the white ink layer; wherein the white ink layer has a non-thick coating portion of a white ink, and a thick coating portion in which an adhesion amount of the white ink is 2 times or more and 8 times or less that of the non-thick coating portion, and the thick coating portion is formed spanning a plurality of the fabric grains of the recording medium.

The white ink printing method according to the first to seventh aspects, and the printed matter according to the eighth aspect are capable of achieving the object of the present invention.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

The invention claimed is:

1. A white ink printing method comprising:

forming a white ink layer by applying white ink to a predetermined region of a recording medium having a plurality of fabric grains, wherein the forming the white ink layer includes forming a localized thick coating portion of the white ink layer, the localized thick coating portion extending between one of a plurality of fabric grains and another one of the plurality of fabric grains in an extending direction that is different from a fabric grain direction.

2. The white ink printing method according to claim 1, wherein the localized thick coating portion of the white ink layer is formed based on a two-dimensional pattern having a distribution which is difficult to be visually recognized.

3. The white ink printing method according to claim 1, wherein the localized thick coating portion of the white ink layer includes m types of thick coating portions, where m is an integer greater than or equal to 1, each having a connection length that is one or more times a fabric grain pitch.

4. The white ink printing method according to claim 1, wherein the localized thick coating portion of the white ink layer is formed at an angle that is substantially orthogonal to the fabric grain direction.

5. The white ink printing method according to claim 1, wherein the localized thick coating portion of the white ink layer is formed at an angle that is 45° or more and 135° or less with respect to the fabric grain direction.

6. The white ink printing method according to claim 1, wherein an area of the localized thick coating portion of the white ink layer is 50% or less of an area of the predetermined region of the recording medium.

7. The white ink printing method according to claim 1, wherein the localized thick coating portion of the white ink layer forms a pattern based on a specific design having a connection length that is one or more times a fabric grain pitch.

8. A printed matter comprising:

a recording medium having a plurality of fabric grains;

a white ink layer disposed on the recording medium; and a colored ink layer disposed on the white ink layer; wherein the white ink layer has a non-thick coating portion of white ink, and a thick coating portion in which an adhesion amount of the white ink is 2 times or more and 8 times or less that of the non-thick coating portion, and the thick coating portion extends between one of the plurality of fabric grains of the recording medium and another one of the plurality of fabric grains in an extending direction that is different from a fabric grain direction.

* * * * *